(12) United States Patent
Liberale et al.

(10) Patent No.: US 8,196,598 B2
(45) Date of Patent: Jun. 12, 2012

(54) ACTUATOR FOR THE ACTUATION OF SUBMARINE DEVICES

(75) Inventors: Carlo Liberale, Pavia (IT); Fabio Imperiali, Voghera-Pavia (IT)

(73) Assignee: Cameron International Corporation, Houston, TX (US)

( * ) Notice: Subject to any disclaimer, the term of this patent is extended or adjusted under 35 U.S.C. 154(b) by 1126 days.

(21) Appl. No.: 10/586,205

(22) PCT Filed: Jan. 6, 2005

(86) PCT No.: PCT/EP2005/000111
§ 371 (c)(1),
(2), (4) Date: Jul. 13, 2006

(87) PCT Pub. No.: WO2005/068883
PCT Pub. Date: Jul. 28, 2005

(65) Prior Publication Data
US 2008/0251745 A1    Oct. 16, 2008

(30) Foreign Application Priority Data

Jan. 13, 2004 (IT) .............. MI2004A0022

(51) Int. Cl.
*F16K 17/36* (2006.01)
(52) U.S. Cl. .................................. 137/81.2
(58) Field of Classification Search ........... 137/81.2
See application file for complete search history.

(56) References Cited

U.S. PATENT DOCUMENTS

| 3,324,875 | A | | 6/1967 | Anderson |
| 3,699,989 | A | * | 10/1972 | O'Connor et al. ......... 137/487.5 |
| 4,774,383 | A | * | 9/1988 | Dalton, Jr. ...................... 174/50 |
| 4,802,502 | A | * | 2/1989 | Williams ....................... 137/382 |
| 5,166,677 | A | | 11/1992 | Schoenberg |
| 5,447,078 | A | | 9/1995 | Robinson et al. |
| 5,473,530 | A | | 12/1995 | Giuseppe et al. |
| 6,279,870 | B1 | * | 8/2001 | Welz et al. ............... 251/129.04 |
| 6,595,487 | B2 | | 7/2003 | Johansen et al. |
| 6,906,438 | B2 | * | 6/2005 | Ursel et al. ...................... 310/89 |
| 2002/0011580 | A1 | | 1/2002 | Johansen et al. |
| 2003/0037544 | A1 | * | 2/2003 | Armstrong ...................... 60/413 |
| 2003/0131885 | A1 | * | 7/2003 | Birtcher et al. ............... 137/240 |
| 2005/0016769 | A1 | * | 1/2005 | Wallace .......................... 175/40 |

FOREIGN PATENT DOCUMENTS

| GB | 2198766 A | | 6/1988 |
| WO | WO01/99259 | * | 12/2001 |

* cited by examiner

*Primary Examiner* — Craig Schneider
(74) *Attorney, Agent, or Firm* — Fletcher Yoder P.C.

(57) ABSTRACT

Submarine actuator for the actuation of a submarine device comprises a container body (2), from which a drive shaft (4) projects that is suitable for inserting in a seat of said submarine device, which through its rotation actuates said submarine device. Said shaft is moved by an electric motor (21, 22) arranged inside said container body and actuated by an electric control signal generated by a remote station.

23 Claims, 5 Drawing Sheets

ACTUATOR FOR THE ACTUATION OF SUBMARINE DEVICES

CROSS REFERENCE TO RELATED APPLICATIONS

This application claims priority to international application number PCT/EP2005/000111, filed on Jan. 6, 2005, which claims priority to Italian application number MI2004A000022, filed on Jan. 13, 2004.

BACKGROUND

The present invention concerns an actuator for the actuation of submarine devices, such as valves for closing and opening submarine ducts.

Plants for transporting liquids and/or gases under the sea, for example the oil pipelines that run even for hundreds of meters under the sea, even at a depth of 3000 meters, comprise a plurality of intermediate stations in which valves for opening and closing the pipes or ducts that transport such liquids or gases are foreseen.

Such valves are actuated by submarine actuators that determine the opening and closing of such valves transmitting a rotation movement to the actuation shaft of the valve itself.

Such actuators are connected to the valves near to the submarine pipelines but must, however, be controlled from the surface or from remote control stations (also submarine).

Actuators are known that are actuated manually by a robot associated with a submarine that reaches the place where the valve and the actuator are situated and transmits the movement to the actuator itself through the robotized arm.

Hydraulic actuators are also known, which are actuated through a hydraulic station arranged at the surface having a hydraulic pipeline that connects such a station at the surface to the submarine actuator. The pipeline transports the hydraulic energy, for example pressurized oil, necessary for the actuation of the valve, on the bottom of the sea where the actuator is situated.

The Applicant has observed that hydraulic type actuators require the presence of an extremely large surface station of substantial environmental impact. Indeed, in such a station it is necessary to generate the necessary hydraulic pressure to actuate the submarine actuator and, moreover, the hydraulic cable suitable for transferring the hydraulic energy to the actuator must have substantial resistance to external pressure, since such actuators can be positioned in transportation plants even 3000 meters under the sea. All of this can determine insufficient reliability of the valve and of the plant as a whole, since the cable that transports the hydraulic energy under the sea could be damaged and therefore could jeopardize the good operation of the valve.

On the other hand, actuators that can just be actuated manually require the use of a submarine to carry out the operation of changing the status of the valve. Such an operation is both complex and expensive and does not allow the valve of the submarine transportation plant to be controlled in real time from the surface.

The Applicant has set itself the problem of making the actuation from the surface or from a submarine control station of a valve applied to a submarine pipeline reliable.

BRIEF DESCRIPTION OF SPECIFIC EMBODIMENTS

The Applicant has made a submarine actuator the movement of which is carried out through at least one electric motor controlled by a remote control station. The communication between the submarine actuator and the station takes place by means of suitable electric cables, sized so as to withstand the external pressure that is present in the depths of the sea.

Moreover, the Applicant has made a system for controlling such an electromechanical actuator, in which the actuation command of the controlled submarine device, for example a fluid transportation valve, can be sent from a control station independently to each electric motor present in the actuator.

An aspect of the present invention concerns a submarine actuator for the actuation of a submarine device comprising a container body from which a drive shaft extends that is suitable for inserting in a seat of said submarine device and through its rotation for actuating said submarine device characterized in that said shaft is moved by at least one electric motor arranged inside said container body and actuated by an electrical control signal generated by a control station.

BRIEF DESCRIPTION OF THE DRAWINGS

The characteristics and advantages of the actuator according to the present invention shall become clearer from the following description, given as an example and not for limiting purposes, of an embodiment with reference to the attached figures in which.

DETAILED DESCRIPTION OF SPECIFIC EMBODIMENTS

Figure 1:
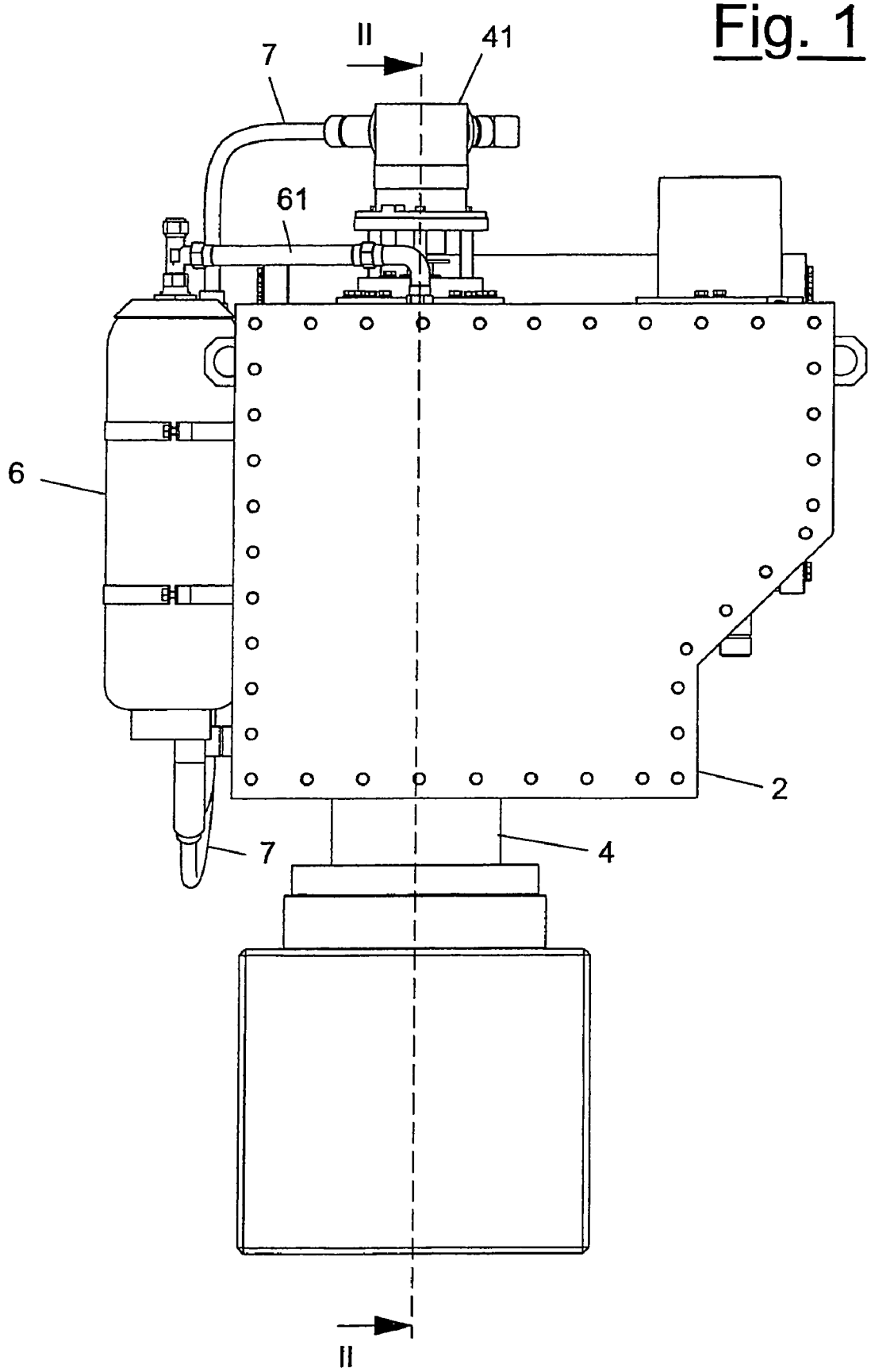
FIG. 1 is a front view of the actuator according to the present invention.
Figure 2:
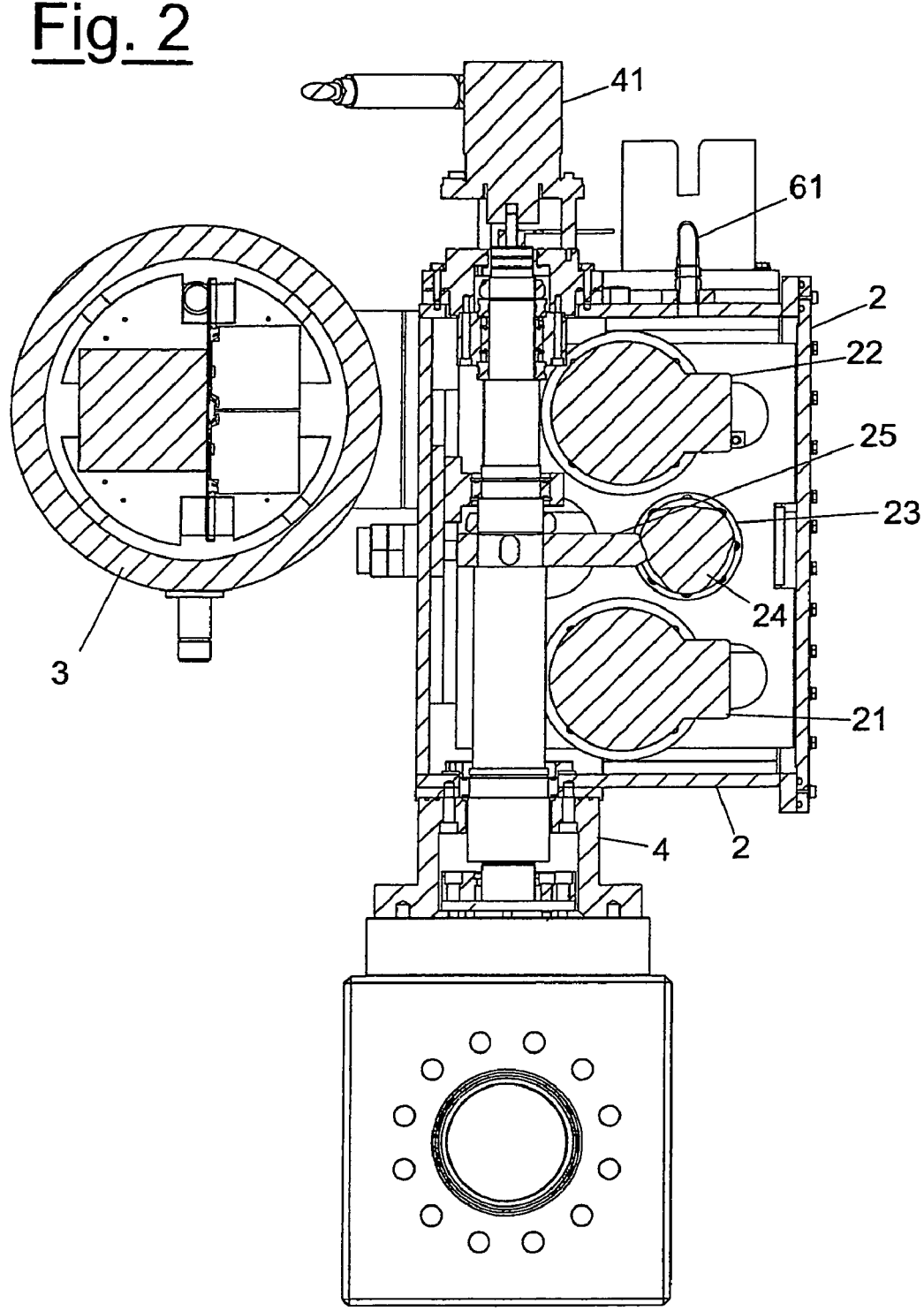
FIG. 2 is a section view along line A-A of FIG. 1 of the actuator according to the present invention.
Figure 3:
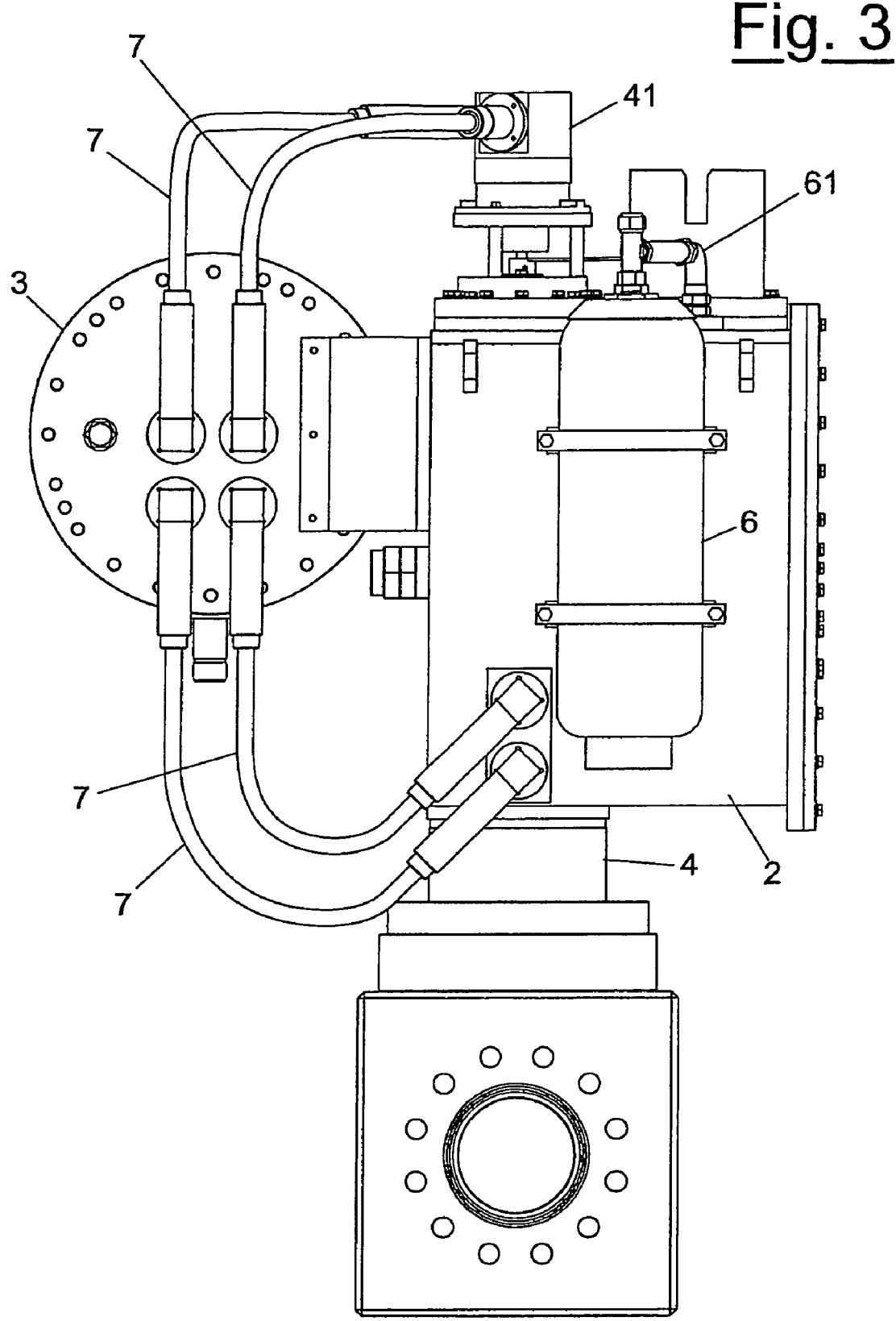
FIG. 3 is a side view of the actuator according to the present invention.

With reference to the quoted figures the actuator according to the present invention is suitable for actuating a submarine device through the coupling of a drive shaft of said actuator in a suitable seat of said submarine device. The submarine device to be actuated is, for example, a valve for opening and closing a submarine pipeline.

The actuator according to the present invention comprises a container body formed from a substantially box-shaped element 2 and from a substantially cylindrical element 3 made in a single body or connected together.

From the base of said box-shaped element a drive shaft 4 projects through which the movement is transmitted to the valve to be actuated.

Inside said box-shaped element at least one electric motor is arranged suitable for transmitting the movement to said drive shaft 4.

Moreover, the movement of said motor is controlled by a series of electronic control boards, which are inserted in said cylindrical element 3.

In the example embodiment illustrated in the figures, the actuator, inside the box-shaped element, comprises two electric motors 21 and 22, each of which can separately control the rotation of said drive shaft 4, through the electronic control board.

The presence of two electric motors that can be controlled independently from each other allows the possibility of a lack of activation of the commanded valve by the actuator to be minimized. Indeed, to block the correct operation of the valve it would be necessary for both of the motors to be shut down simultaneously.

The rotation of the drive shaft 4, able to be carried out independently by each of the motors, can, for example, be obtained through a gear mechanism, which comprises a transmission shaft 23, connected through a pair of gears to the rotation shafts of the two electric motors 21 and 22. On such a transmission shaft a worm screw 24 is provided, integral with the rotation of said shaft, which engages with a further sprocket 25 made on the extension of said drive shaft inside said box-shaped element 2.

The box-shaped element 2 is preferably filled on the inside with a lubricating liquid, for example a high-density insulating oil, and is provided with a device for the compensation of the external pressure comprising a pocket accumulator 6, firmly connected on a side of said box-shaped element that balances the internal pressure with the external pressure through a separation membrane and connected to the actuator by an inlet pipeline 61.

Moreover, the drive shaft 4 completely crosses the box-shaped element and, on its upper end 41 a visual recognition device of the position taken up by the valve commanded by the movement of the drive shaft 4 is foreseen. Moreover, on such an upper end of the drive shaft a seat is formed for the insertion of a possible robotized arm suitable for rotating the drive shaft in an emergency situation in which it is not possible to actuate the drive shaft electrically. The cylindrical element is a hermetic container into which a pressurized gas, for example nitrogen, is inserted, which encloses the electronic control boards for the motors inside it. The electrical connections between the electronic control board and the motors are carried out by means of electric cables 7 connected to said cylindrical element and to said box-shaped element through connectors and hermetic through element.

Figure 4:
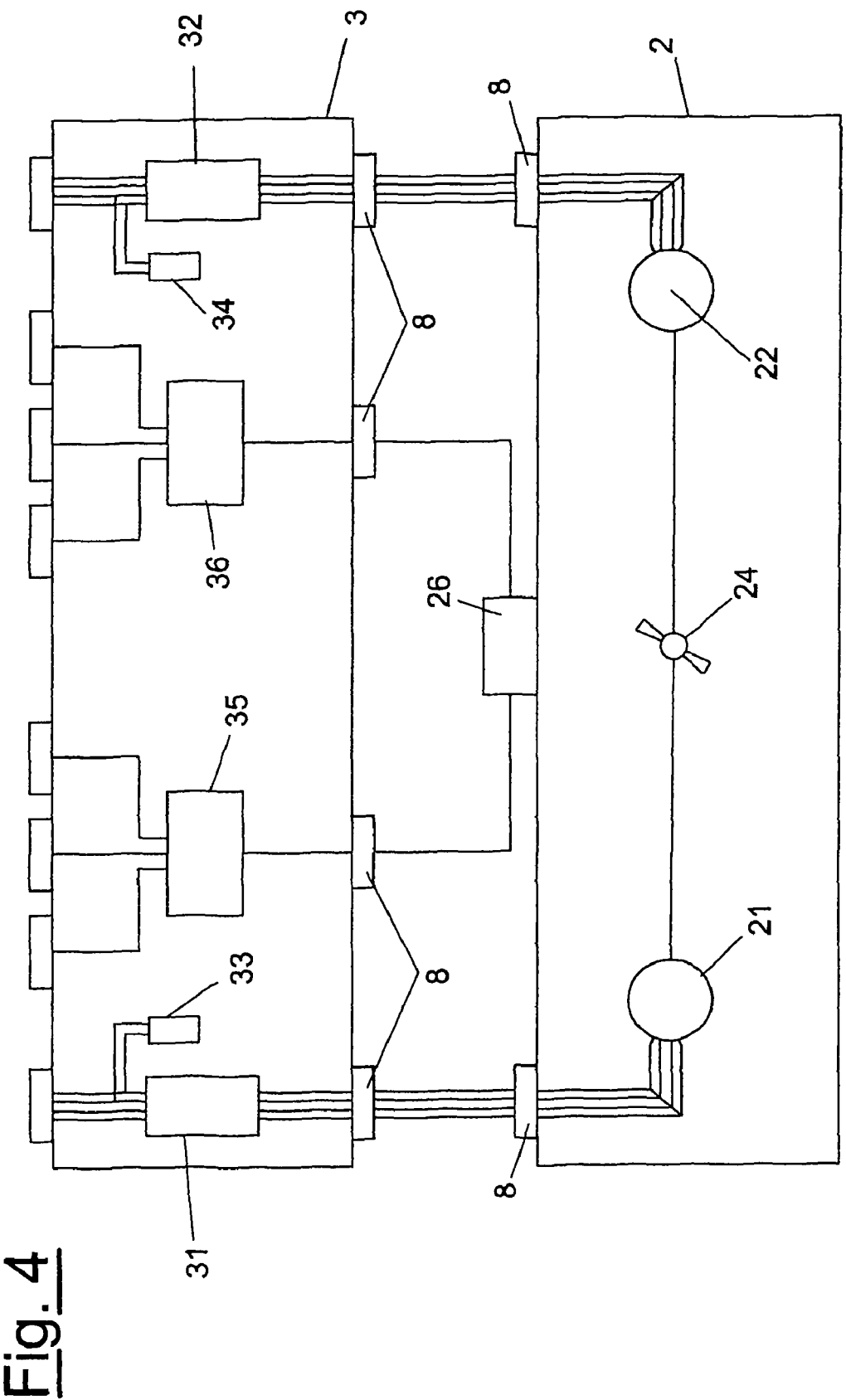
FIG. 4 schematically illustrates an example of an electronic control board of the actuator according to the present invention.

An example of the electronic control board container in the actuator according to the present invention is schematically illustrated in FIG. 4. Such a board comprises a pilot circuit 31 or 32, a power supply circuit 33 or 34 and a programmable logic unit 35 or 36 for each motor.

It is foreseen that there is, associated with the drive shaft 4 of the actuator, a transducer 26 of the position of such a shaft, which is electrically connected with each programmable logic unit.

The parts of the control board inserted inside the cylindrical element are in connection with the parts arranged inside the box-shaped element through the electric cables 7, the connectors and/or the hermetic through elements 8.

The power supply of said electric motors can be carried out through a suitable power supply cable transported by the control station to the submarine actuator; alternatively, the electric power supply for said motors can be directly obtained from electric power supply lines associated with the submarine transportation plant.

Figure 5:
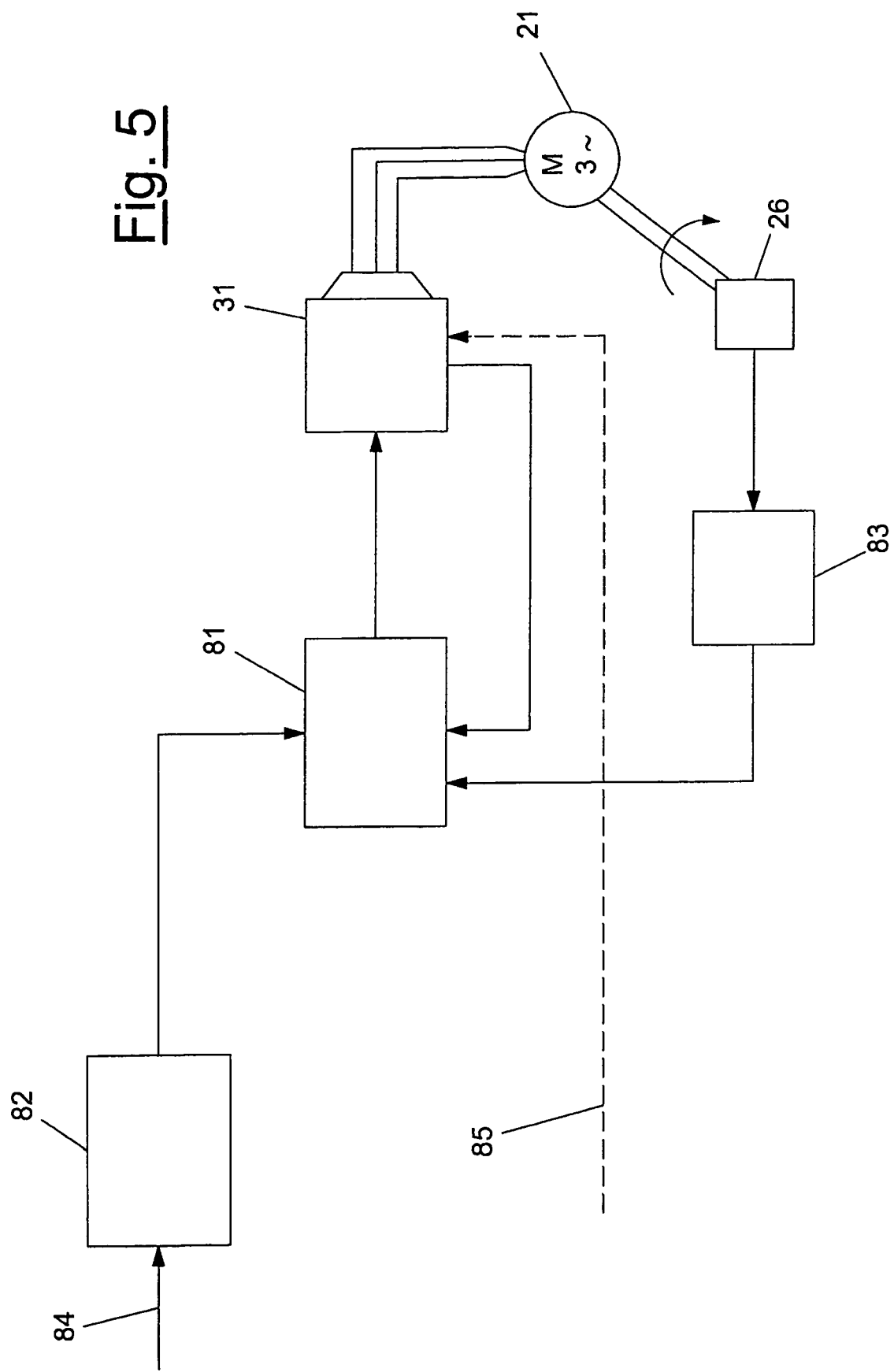
FIG. 5 schematically illustrates the main functions of the electronic control board according to the present invention.

The control system of the electromechanical actuator according to the present invention is conveniently summarized in the block diagram of FIG. 5, in which for each motor 21 or 22 (in the figures the control system for the first motor 21 is illustrated), the quoted pilot circuit 31, and the position transducer 26 and the functions that are carried out by the programmable logic unit 35 comprising a positioning block 81 that interfaces with the pilot circuit of the motor 31 (inverter), a filtering block 82 for a control signal of the actuator and a decoding block 83 of the signal generated by the position transducer 26 are illustrated.

The actuator commands the opening and closing of the valve or of the submarine device with which it is associated through a control signal sent to a control input 84. The control signal is preferably filtered through such a filtering block 82 in order to limit possible irregularities in the control signal.

The control signal SC can advantageously be of the on-off type or else it can be a continuous signal that determines a regulation command for the valve with linear displacements from 0% to 100%.

In particular, the filtered control signal SCF is obtained, having memorized a predetermined number N of prior input commands SCP from which an average MCP (average of previous commands) has been worked out according to the following formula:

$$SCF = \frac{[(MCP*N)+SC]}{N+1}.$$

Moreover, the position signal of the valve or of the controlled submarine device is detected through the position transducer 26, which generates a signal, for example typically a 4-20 mA signal, which is decoded by said decoding block 83 and sent to the positioning block.

The decoding block carries out a comparison between the signal received and previous memorized signals corresponding to the open and closed limit positions of the valve. From such a comparison and from subsequent processing, through a linearizing function, a precise and reliable decoded position signal is obtained. The value of the transducer is monitored constantly, in order to check its validity and correct operation; indeed, an error of the transducer would result in a blocking of the positioning function and therefore a blocking of the command of the valve.

The positioning block functions 81 are substantially the core of the system and comprise the processing of the signals coming from the position transducer 26 through the decoding block 83, from the control input 84 through the filtering block 82 and from the pilot circuit 31, in order to generate an activation signal of the electric motor 21.

Preferably, the processing consists of calculating a speed value and direction SP for the rotation of the motor starting from the position value of the valve to be reached SETP (open/closed) and from the current position of the valve POSA and sending a corresponding signal to the pilot circuit of the motor. For such a purpose, the positioning block also receives the value of the current absorbed by the motor from the pilot circuit, so as to be able to carry out a double retroaction control both through the position transducer and through such absorption current of the motor.

Therefore, in short, the electronic control board comprises a first retroaction circuit of the current absorbed by the motor between the programmable logic unit and the pilot circuit, and a second pilot circuit of the position signal of the drive shaft between said transducer and said programmable logic unit.

The speed value can be calculated through the following formula:

$$SP = \sqrt{SETP - POSA * KGAIN}$$

Where KGAIN represents the gain of the positioning ring with reference to the retroaction of the position transducer.

The calculated speed value is advantageously limited to a maximum predetermined value, set based upon the displacement times that are intended to be carried out on the valve.

Moreover, the system foresees that it is possible to control the motor through an emergency control signal 85, which acts directly on the pilot circuit 31 and therefore on the electrical actuation of the motor eliminating any control carried out by the programmable logic unit of the actuator. The actuator carries out the emergency maneuver when it receives the aforementioned emergency control signal.

The actuator according to the present invention comprises at least two motors, each of which can be controlled independently from the control station through the system described above in a master-slave type configuration. This makes it possible, in the case in which there is an alarm on a motor, or on an electronic control board of the motor, for the system to automatically take care of switching the command onto the other motor of the actuator.

The invention claimed is:

1. A method, comprising:
    pneumatically pressurizing a control circuit in a first enclosure portion of a submersible actuator, wherein the first enclosure portion is hermetically sealed, and wherein pneumatically pressurizing comprises inertly pressurizing the control circuit in the first enclosure portion with pressurized nitrogen; and
    hydraulically pressurizing at least one electric motor in a second enclosure portion of the submersible actuator, wherein the control circuit is coupled to the at least one electric motor.

2. The method of claim 1, comprising receiving an electrical control signal from a remote control station, processing the electrical control signal in the control circuit, and triggering the electric motor to actuate a submerged flow control mechanism.

3. The method of claim 1, wherein the at least one electric motor comprises first and second electric motors, and the method further comprises independently controlling the first and second electric motors to enable independent actuation of a submerged flow control mechanism.

4. The method of claim 1, comprising controlling the submersible actuator based on a target position, feedback, and historical data associated with the submersible actuator.

5. The method of claim 1, comprising controlling a speed value and a direction for rotation of the at least one electric motor based on a target shaft position and a current shaft position sensed by a position sensor.

6. The method of claim 1, comprising controlling the submersible actuator based on a first feedback indicative of an actuator position and a second feedback indicative of an absorbed current.

7. The method of claim 1, wherein the first and second enclosure portions are capable of withstanding pressures at up to 3,000 meters of sea depth.

8. A system, comprising:
    a submersible actuator, comprising:
        a first container filled with a liquid;
        a second container filled with nitrogen;
        an electric motor disposed in the first container; and
        a control circuit disposed in the second container, wherein the second container is hermetically sealed, and wherein the control circuit is configured to control the electric motor to actuate a submarine device.

9. The system of claim 8, wherein the submersible actuator comprises a worm gear coupled to the electric motor.

10. The system of claim 8, wherein the control circuit is configured to adjust a speed of the electric motor based on a current position and a target position of the submarine device.

11. The system of claim 8, wherein the control circuit is configured to control the electric motor based on historical data associated with the actuation of the submarine device.

12. The system of claim 8, wherein the control circuit is configured to control the electric motor based on feedback indicative of a current absorbed by the electric motor.

13. The system of claim 8, comprising a visual recognition device and a robot interface coupled to the submersible actuator, wherein the visual recognition device enables viewing of an actuation position associated with the submarine device, and the robot interface enables a robot to control the submersible actuator.

14. The system of claim 8, wherein the first and second containers are capable of withstanding pressures at up to 3,000 meters of sea depth.

15. A system, comprising:
    a submersible actuator, comprising:
        a first housing having an electric motor disposed in a first pressurized fluid, wherein the first pressurized fluid is a pressurized lubricating liquid; and
        a second housing having a control circuit disposed in a second pressurized fluid, wherein the second housing is hermetically sealed, wherein the second pressurized fluid is nitrogen, and wherein the control circuit is coupled to the electric motor, and the control circuit is configured to communicate with a remote control station.

16. The system of claim 15, wherein the control circuit is configured to compare a value of a control signal with an average of a predetermined number of previous control signals.

17. The system of claim 15, comprising a membrane accumulator coupled to the submersible actuator and configured to balance internal and external pressures.

18. The system of claim 15, wherein the control circuit is configured to control the electric motor based on feedback indicative of a current absorbed by the electric motor.

19. The system of claim 15, comprising a flow control mechanism coupled to the submersible actuator.

20. The system of claim 15, wherein the control circuit is configured to control a speed value and a direction for rotation of the electric motor based on a target shaft position and a current shaft position sensed by a position sensor.

21. The system of claim 15, wherein the first and second housings are capable of withstanding pressures at up to 3,000 meters of sea depth.

22. The system of claim 15, wherein the submersible actuator comprises another electric motor coupled to the control circuit, and the control circuit is configured to control the electric motors independent from one another.

23. The system of claim 22, wherein the electric motors are independently drivingly coupled to a drive shaft via a transmission, wherein the transmission comprises a transmission shaft, a worm screw coupled to the transmission shaft, and a sprocket coupled to the worm screw and the drive shaft, wherein the electric motors are coupled to the transmission shaft.

* * * * *